United States Patent
Matsumoto

(10) Patent No.: US 7,869,638 B2
(45) Date of Patent: Jan. 11, 2011

(54) IMAGE PROCESSING METHOD AND COMPUTER READABLE MEDIUM FOR IMAGE PROCESSING

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 1093 days.

(21) Appl. No.: 11/559,415

(22) Filed: Nov. 14, 2006

(65) Prior Publication Data

US 2008/0008368 A1 Jan. 10, 2008

(30) Foreign Application Priority Data

Nov. 15, 2005 (JP) ............................. 2005-330604

(51) Int. Cl.
*G06K 9/00* (2006.01)
(52) U.S. Cl. ........................ 382/128; 382/130; 382/131; 382/132
(58) Field of Classification Search ................. 382/128, 382/131, 154; 600/425
See application file for complete search history.

(56) References Cited

U.S. PATENT DOCUMENTS

| | | | | |
|---|---|---|---|---|
| 5,971,767 A | * | 10/1999 | Kaufman et al. | 434/267 |
| 6,366,800 B1 | * | 4/2002 | Vining et al. | 600/425 |
| 6,369,812 B1 | | 4/2002 | Iyriboz et al. | |
| 7,379,573 B2 | * | 5/2008 | Tomoda et al. | 382/128 |
| 2004/0059214 A1 | | 3/2004 | Tomoda et al. | |

FOREIGN PATENT DOCUMENTS

| | | |
|---|---|---|
| JP | 11-219448 | 8/1999 |
| JP | 2004-073379 A | 3/2004 |

OTHER PUBLICATIONS

Japanese Office Action dated Jun. 17, 2009.

* cited by examiner

*Primary Examiner*—Tom Y Lu
(74) *Attorney, Agent, or Firm*—Pearne & Gordon LLP

(57) ABSTRACT

An intestine is cut by a cross section of a spherical surface or a combination of a plane and a spherical surface, and voxel values on the cross section are projected onto a projection plane in parallel, whereby a cross-sectional image of the intestine is created. Unlike a CPR image, the image of the spherical portion is projected without being extended. If the radius of the spherical surface is increased, the depth toward a screen can be seen and thus perspective of the inside of the observation object can be understood. On the other hand, if the radius of the spherical surface is lessened, the cut surface of the observation object is displayed as flat MPR and can be observed without distortion. Therefore, the radius of the spherical surface is set appropriately in conjunction with the thickness of the observation object, whereby a precise diagnosis can be conducted.

9 Claims, 20 Drawing Sheets

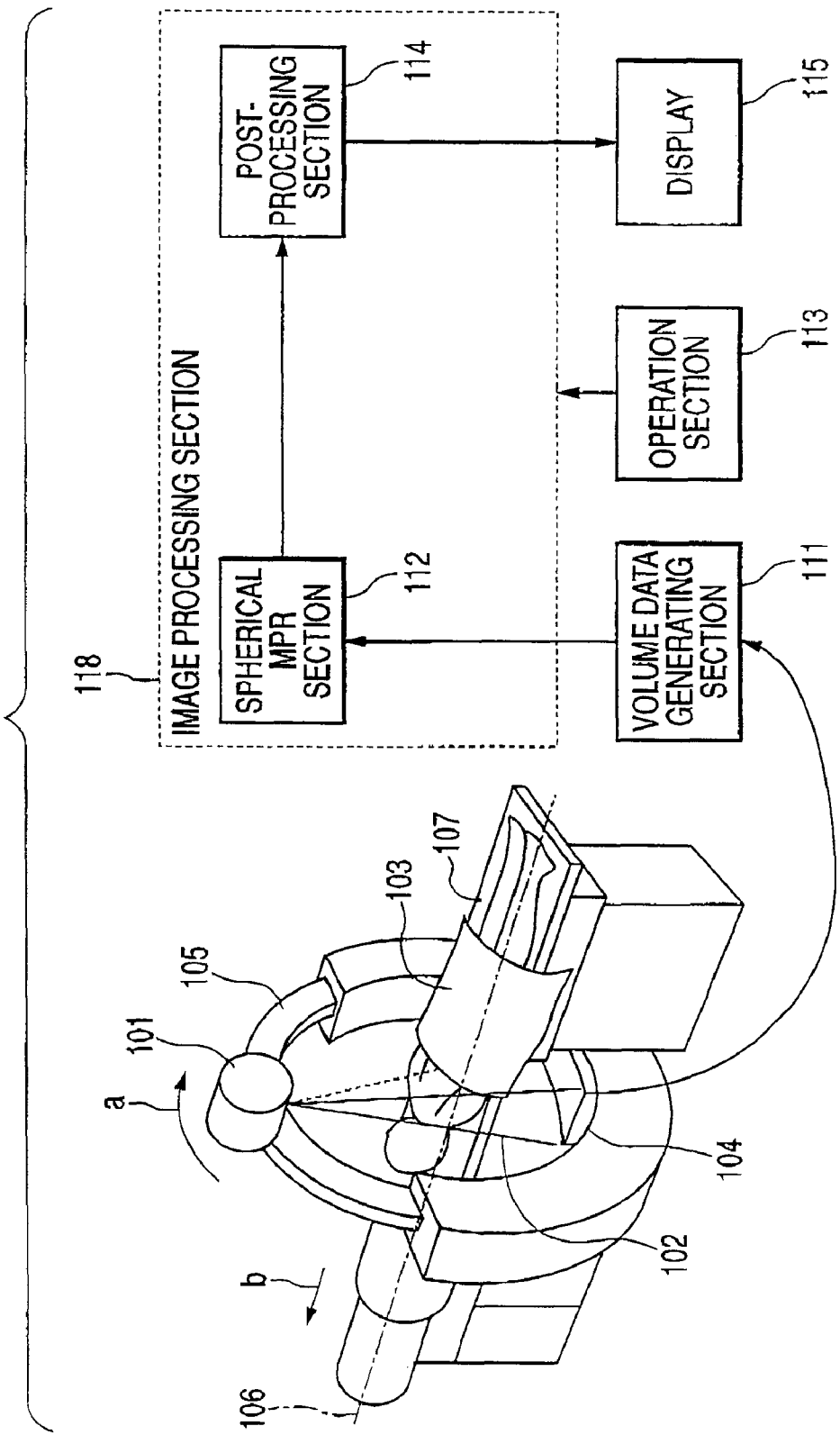

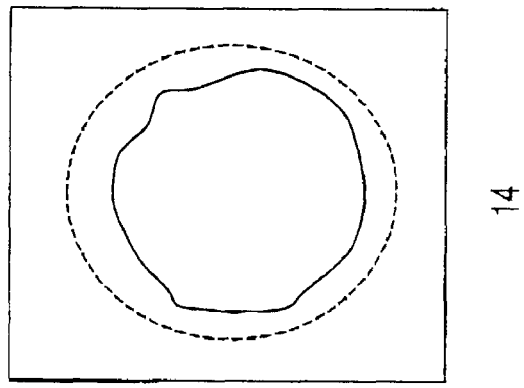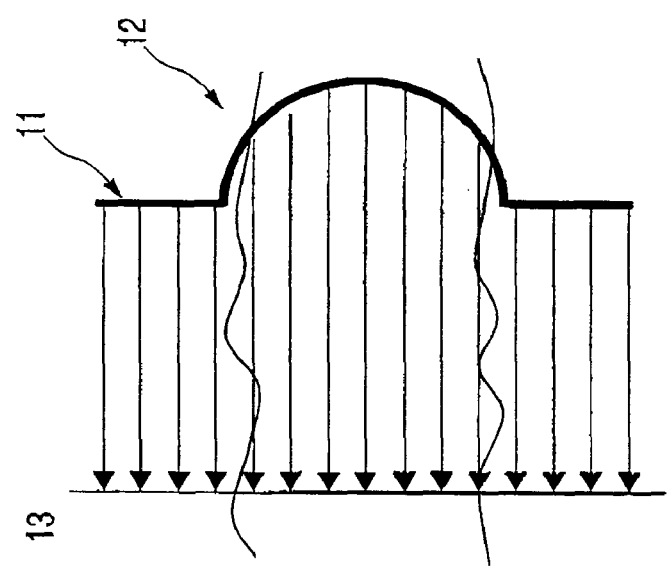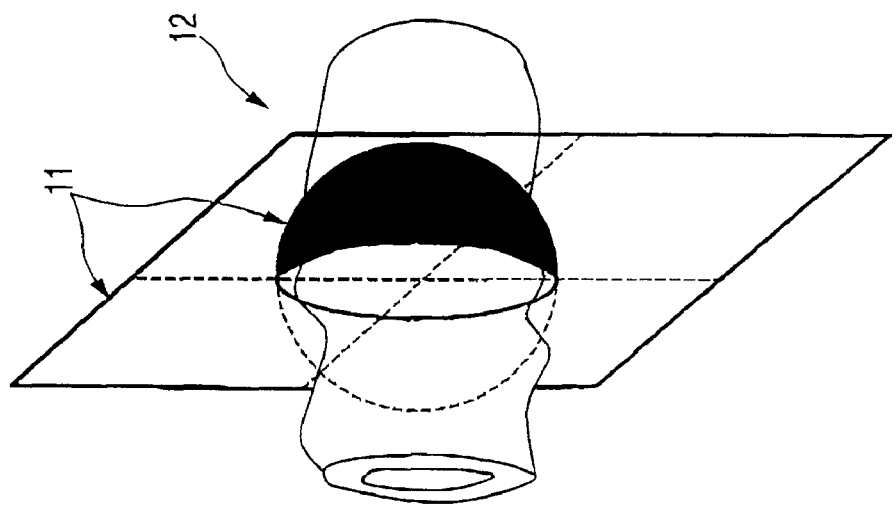

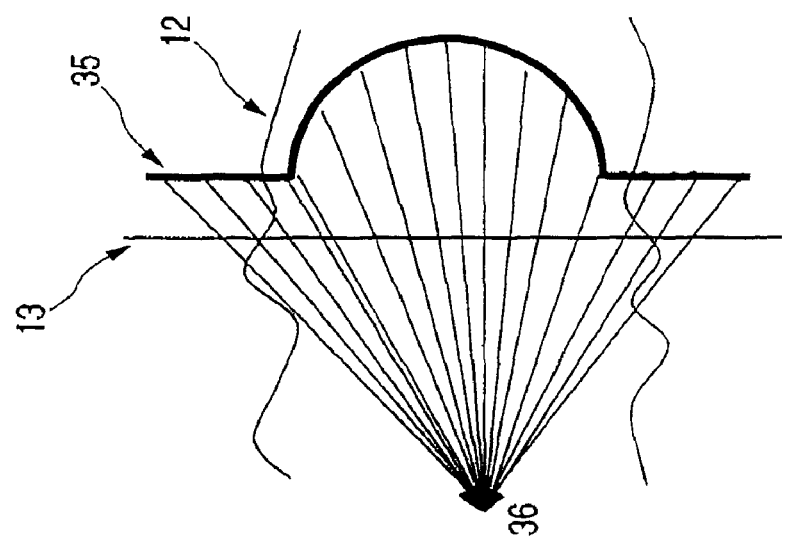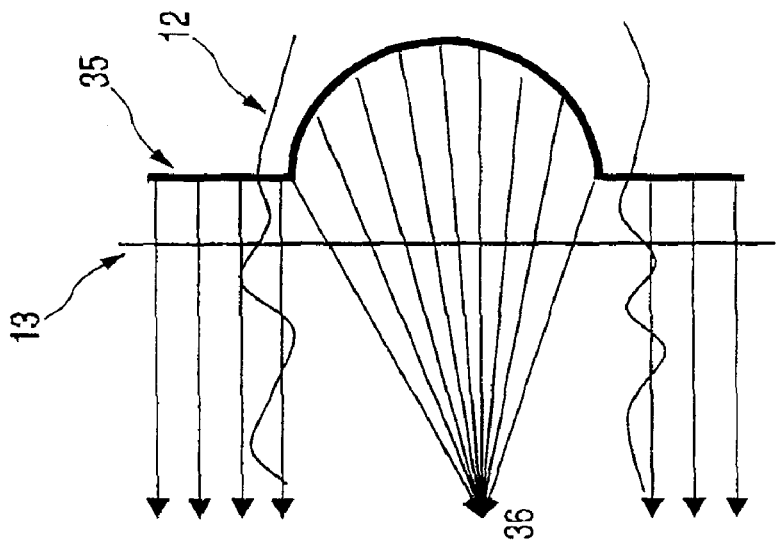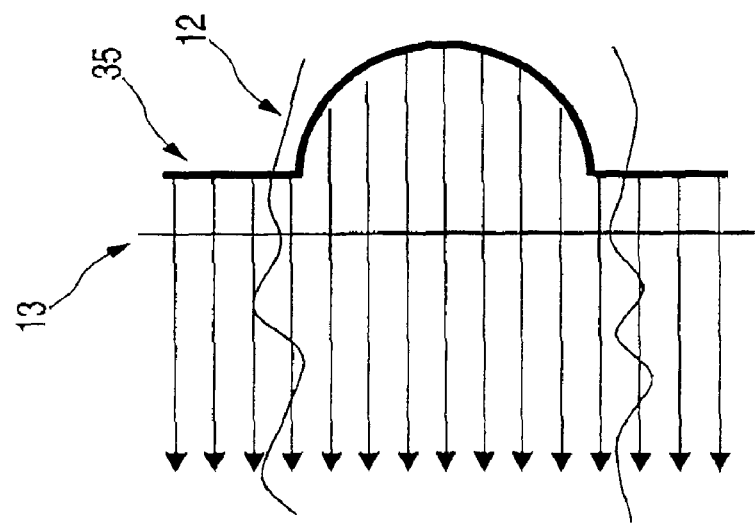

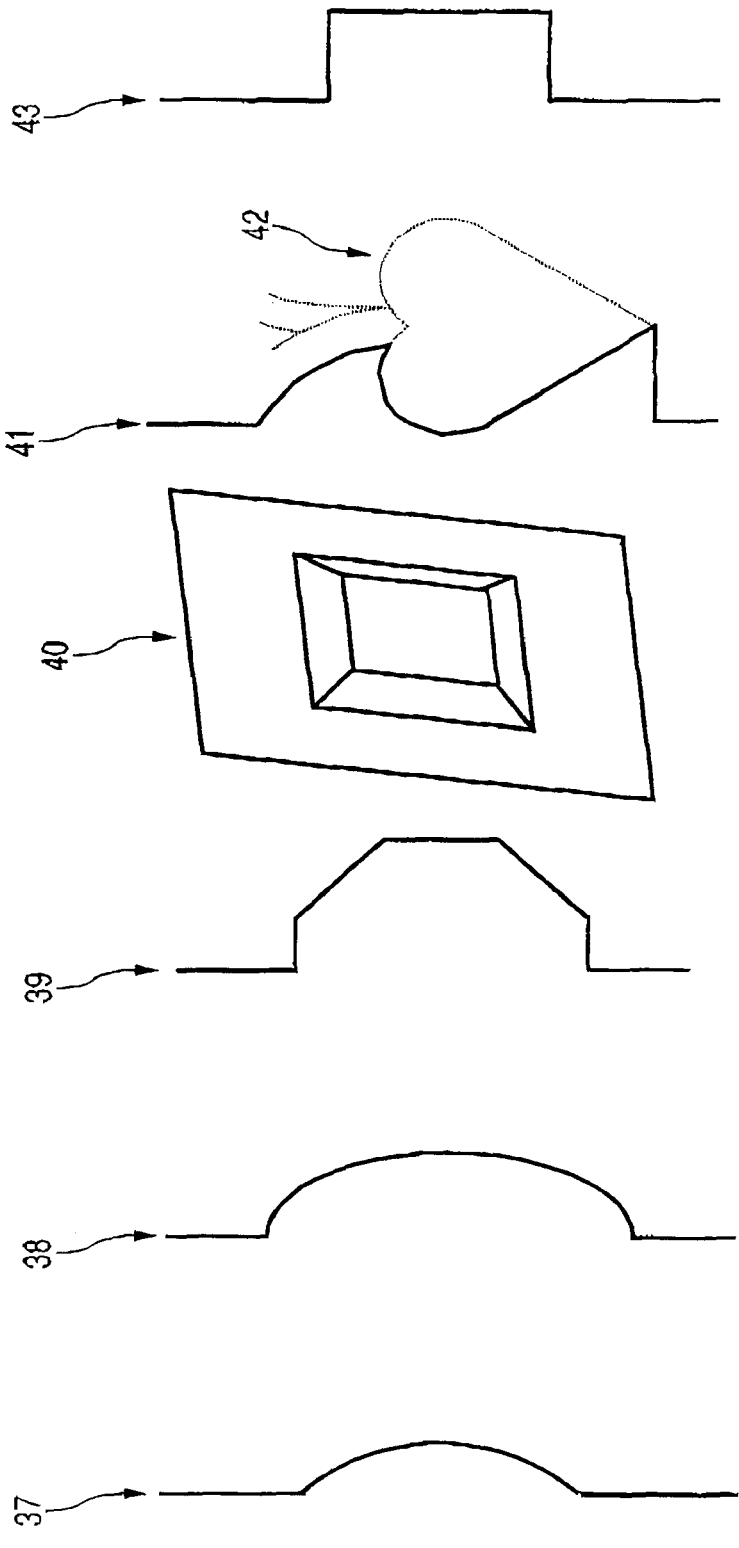

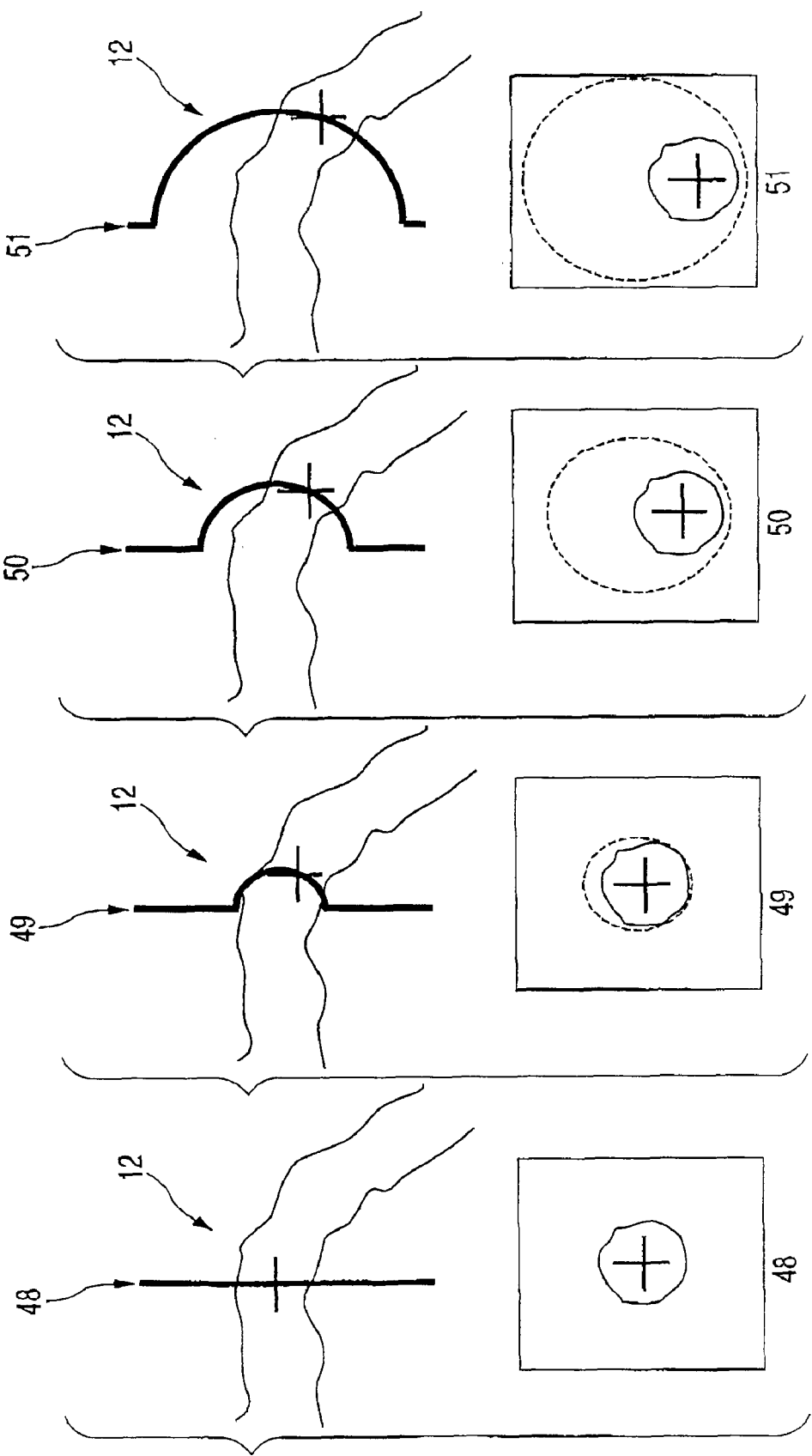

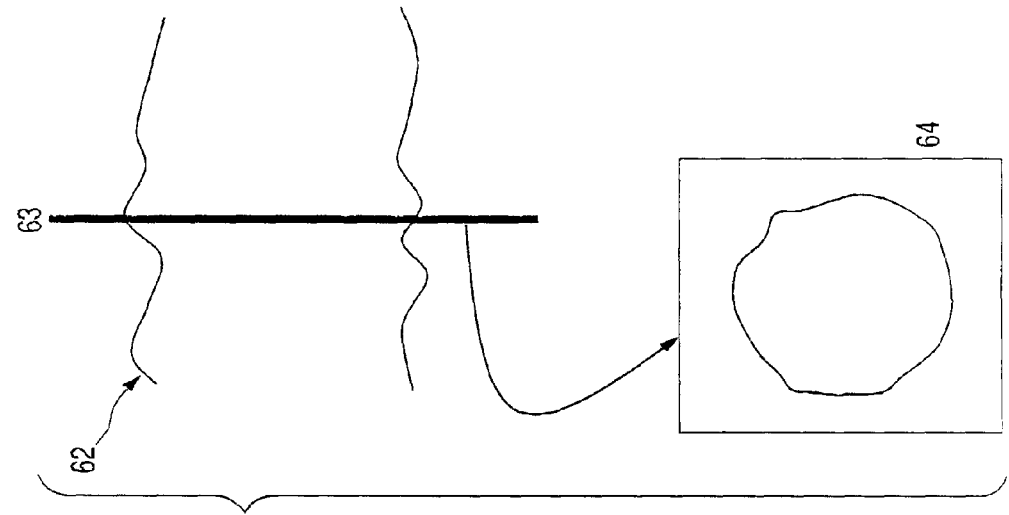
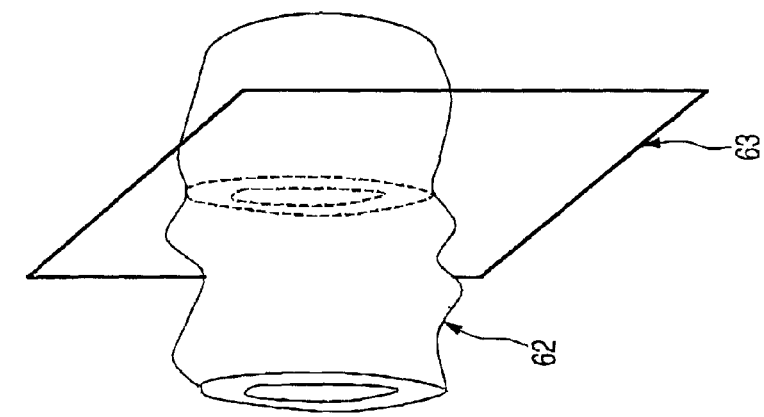
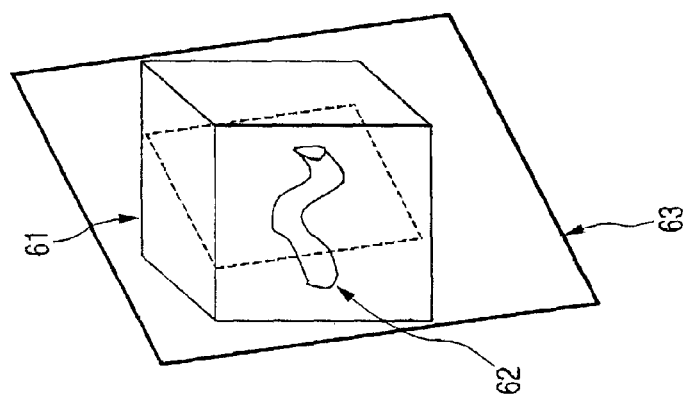

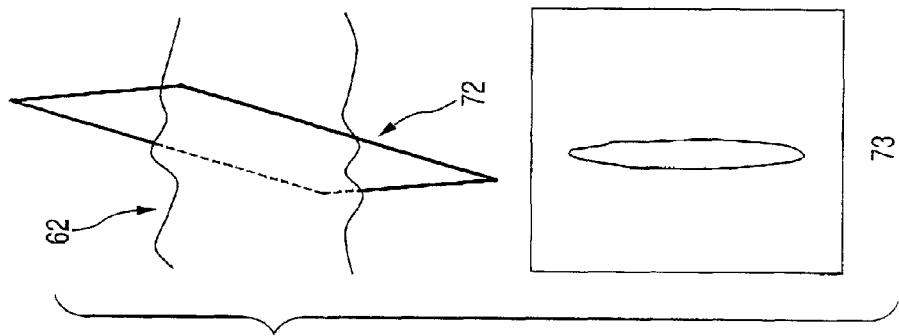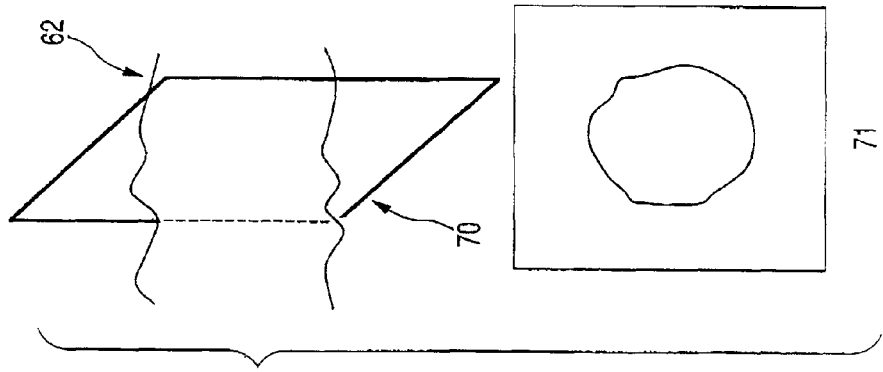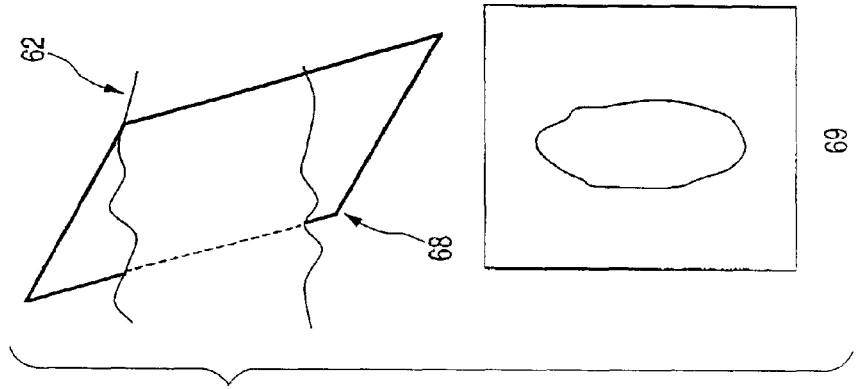

IMAGE PROCESSING METHOD AND COMPUTER READABLE MEDIUM FOR IMAGE PROCESSING

This application claims foreign priority based on Japanese Patent application No. 2005-330604, filed Nov. 15, 2005, the content of which is incorporated herein by reference in its entirety.

BACKGROUND OF THE INVENTION

1. Field of the Invention

This invention relates to an image processing method and a computer readable medium for image processing for visualizing volume data.

2. Description of the Related Art

A revolution is brought about in the medical field with the advent of a CT (Computed Tomography) apparatus and an MRI (Magnetic Resonance Imaging) apparatus making it possible to directly observe the internal structure of a human body as the image processing technology using a computer moves forward, and medical diagnosis using the tomographic image of a living body is widely conducted. While, three-dimensional structure inside of a human body is hard to understand simply from the tomographic image of a human body. Further, in recent years, as a technology for visualizing the complicated three-dimensional structure has advanced, for example, volume rendering for directly rendering an image of the three-dimensional structure from three-dimensional digital data of an object provided by a CT apparatus has been used for medical diagnosis.

MPR (Multi Planar Reconstruction) for cutting out an &arbitrary cross section from volume data and displaying the cross section, CPR (Curved Planer Reconstruction) for setting a path in volume data, setting a cross-sectional curved surface along the path, and displaying the cross-sectional image, MPR with thickness for cutting out a region with some thickness and performing MPR processing to reduce noise and make meandering tissue such as a vessel easy to observe, and the like are generally used as three-dimensional image processing in the volume rendering. MPR with thickness can be obtained b combining plural of parallel cross section images. Further, a term "flat MPR" will be used to emphasize that MPR is related with flat surface.

On the other hand, a projection method of setting an eye point and a projection plane and projecting volume data existing between the eye point and the projection _plane onto the projection plane as seen from the eye point is available. A parallel projection method and a perspective projection method are known as the projection method.

The parallel projection method is a method of setting an eye point at an infinite distance and projecting volume data onto a projection plane in parallel from the eye point; the method is suited for forming the object such as an organ converted into volume data as an image viewed from the outside of the object. On the other hand, the perspective projection method is a method of projecting volume data existing between an eye point and a projection plane onto the projection plane radially with the eye point as the center position; the method is suited for creating a virtual endoscope image for an organ.

FIGS. 18A-18C are drawings to describe flat MPR in a related art for generating a cross-sectional image of Volume data 61. The flat MPR is a technique, for example, for cutting the volume data 61 containing an intestine 62 by a cross section 63 of an; arbitrary plane as shown in FIG. 18A and FIG. 18B, and rendering voxels on the cross section 63 as shown in FIG. 18C, thereby providing a cross-sectional image 64 of the intestine 62 as shown in FIG. 18C.

In the flat MPR, only the tissue on a single plane is rendered and the 3 dimensional relation of the tissue is hard to understand and thus a method of cutting volume data by two or more planes crossing each other, exfoliating the cut planes, and displaying a plurality of MPRs at the same time. For example, exfoliating and displaying the cross section cut by a cube is known. (For example, refer to JP-A-11-219448.)

A method of projecting light onto a spherical surface from the inside with the center of a sphere as an eye point for volume data and exfoliating the spherical projection image to a plane and displaying the image is known. In this case, the spherical surface is approximated to a polyhedron (cube/26-plane polyhedron) and light is projected perpendicularly onto each plane. (For example, refer to U.S. Pat. No. 6,369,812.)

FIG. 19 is a drawing to describe virtual endoscope image in a related art n the virtual endoscope image in the related art, an intestine 62 is seen from an eye point 66 and a perspective projection image 67 projected onto a projection plane 64 is displayed. Thus, to observe the intestine 62, only the medial surface of the intestine 62 is displayed.

FIGS. 20A-20C are drawings to describe problem (1) of the flat MPR in the related art. In the flat MPR in the related art, if a cross section 70 is perpendicular to the running direction of an intestine 62, the whole shape of the intestine 62 becomes clear according to a cross-sectional image 71 as shown in FIG. 20B; if the running direction of the intestine 62 is inclined with respect to cross sections 68 and 72, the perpendicular cross section of the intestine 62 is not displayed as shown in cross-sectional images 69 and 73 and thus the cross-sectional shape of the intestine 62 is hard to understand, as shown in FIG. 20A and FIG. 20C. If the angle of the cross section 68, 70, 72 is changed, the location of the cross section moves and thus it is difficult to understand the displayed part of the intestine 62.

On the other hand, in FIG. 20B, the cross section of the intestine 62 displayed in the cross-sectional image 71 is almost circular and therefore it can be determined that the cross section 70 is orthogonal to the intestine 62; however, if an organ is not circular, it is difficult to determine the orientation of the cross section. Particularly, to conduct a precise diagnosis, periphery of the affected part should be observed based on the orthogonal cross section, and thus if the orthogonal cross section cannot be determined from an MPR image, smooth medical examination is hindered.

FIG. 21 is a drawing to describe problem (2) of the flat MPR in the related art. To conduct virtual endoscope inspection on tubular tissue such as an intestine 62, hitherto a center path 74 of the tubular tissue has been set using MPR images in cross sections 1 to 7, etc. However, since it is hard to understand the depth and the running direction of the tubular tissue, it is difficult to set an appropriate orthogonal cross section angle.

That is, to obtain a precise image, it is necessary to set a cross section perpendicular to the running direction of the virtual endoscope inspection, but it is difficult to adjust the angle of the cross section to meandering of the tubular tissue. For example, the center path 74 is determined while viewing the MPB images in cross sections 1 to 7, etc.; to make a transition from cross section 3 to cross section 4 or from cross section 5 to cross section 6, it is difficult to find out the center of the intestine. Further, it is also difficult to set the center path connecting the tissue centers.

SUMMARY OF THE INVENTION

The present invention has been made in view of the abode circumstances, and provides an image processing method and a computer read able medium for image processing capable of generating an image for enabling the user to easily understand depth information of an observation object.

Further, the present invention provides an image processing method and a computer readable medium for image processing capable of easily setting a cross section orthogonal to a tubular tissue of an intestine, a vessel, a trachea, etc., to be observed and easily setting a center path of the tubular tissue.

In some implementations, an image processing method for visualizing volume data, the image processing comprising:

determining respective coordinates for forming a cross section by using respective positions on a reference plane and respective distances from the reference plane;

determining respective values in the volume data at the respective coordinates; and rendering an image by using the determined values.

According to the configuration, the coordinates are defined as desired from each position on the reference plane and each distance from the reference plane, whereby a cross section of the volume data cut by an arbitrary surface without overhand can be drawn, so that an image can be generated for enabling the user to easily understand the depth information of the observation object. Accordingly, a cross section orthogonal to the observation object and a center path of the observation object can be set easily.

In the image processing method of the invention, the image is rendered by using only the values included in a partial region of the volume data.

According to the configuration, only the necessary part of the volume data is rendered, whereby the image of the observation object can be displayed rapidly.

In the image processing method of the invention, the distances are changed by modifying a single parameter. The image processing method of the invention further includes modifying the parameter with GUI (Graphical User Interface). The image processing method of the invention further includes generating animation image by modifying the parameter.

In the image processing method of the invention, at least a part of the coordinates are positioned on a spherical surface. The image processing method of the invention further includes modifying a radius of the spherical surface.

In the image processing method of the invention, the reference plane is rotatable.

In the image processing method of the invention, the image is rendered by using peripheral values of the coordinates in addition to the determined values.

According to the configuration, the volume data of the observation object is cut by a region having some thickness and the voxel values of the average value, the maximum value, the minimum value, etc., in the region having some thickness are projected onto the projection plane, whereby noise of a contrast medium, etc., is reduced, meandering tissue such as a vessel is made easy to observe, and the center path of a vessel, etc., can be set easily, so that virtual endoscope inspection can be conducted rapidly. The information existing on a spherical surface continues to exist on the spherical surface even though the spherical surface rotates, so that the information is not lost and the center path of a vessel, etc., can be set by intuitively.

In the image processing method of the invention, the volume data is volume data of a tubular tissue, and the image processing method further comprising:

determining an orthogonal cross section of the tubular tissue with GUI (Graphical User Interface); and rendering each voxel on the orthogonal cross section.

In the image processing method of the invention, the volume data is volume data of a tubular tissue, and the image processing method further comprising:

determining a center path of the tubular tissue with GUI (Graphical User Interface).

Further, in some implementations, a computer readable medium having a program including instructions for permitting a computer to perform image processing for visualizing volume data, the instructions comprising:

determining respective coordinates for forming a cross section by using respective positions on a reference plane and respective distances from the reference plane;

determining respective values in the volume data at the respective coordinates; and rendering an image by using the determined values.

BRIEF DESCRIPTION OF THE DRAWINGS

In the accompanying drawings:

FIG. 1 is a drawing to schematically show a computerized tomography (CT) apparatus used with an image processing method according to an embodiment of the invention;

FIGS. 2A, 2B and 2C are drawings to describe an image processing method using spherical MPR according to an embodiment of the invention;

FIGS. 8A, 8B and 8C are drawings to show cross section projection methods as modified example 1 of the image processing method of an embodiment of the invention;

FIGS. 9A, 9B, 9C, 9D, 9E and 9F are drawings to show various shapes of cross sections to cut volume data as modified example 3 of the image processing method of an embodiment of the invention;

FIGS. 11A, 11B, 11C and 11D are drawings to show image of a cross-sectional image as animation as modified example 5 of image processing method of an embodiment of the invention;

FIGS. 18A, 18B and 18C are drawings to describe flat MPR in a related art;

FIGS. 20A, 20B and 20C are drawings to describe problem (1) of the flat MPR in the related art.

DESCRIPTION OF THE PREFERRED EMBODIMENTS

Figure 3C:
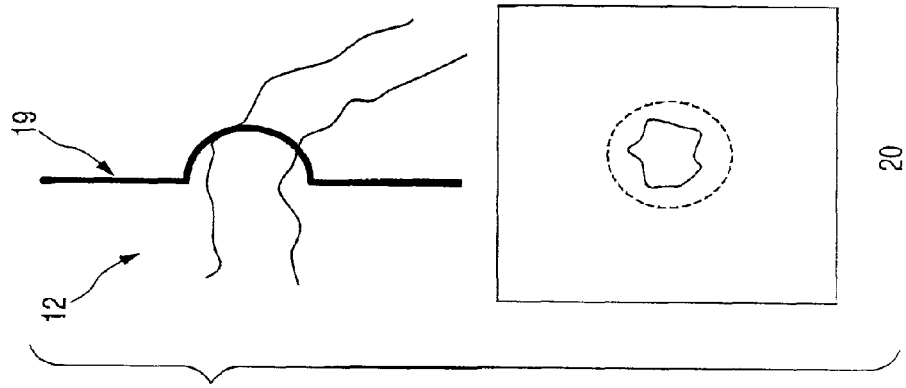
FIGS. 3A, 3B and 3C are schematic representations for changing the radium of a spherical surface in the image processing method using spherical MPR according to an embodiment of the invention.

FIG. 1 schematically shows a computed tomography (CT) apparatus used in an image processing method according to an embodiment of the invention. The computed tomography apparatus is used for visualizing tissues, etc., of a subject. A pyramid-like X-ray beam 102 having edge beams which is represented by dotted lines in FIG. 1 is emitted from an X-ray source 101. The X-ray beam 102 is applied on an X-ray detector 104 after transmitting through the subject, for example, a patient 103. In this embodiment, the x-ray source 101 and the x-ray detector 104 are disposed in a ring-like gantry 105 so as to face each other. The ring-like gantry 105 is supported by a retainer not show in FIG. 1 so as to be rotatable (see the arrow "a") about a system axis 106 which passes through the center point of the gantry.

The patient 103 is lying on a table 107 through which the X-rays are transmitted. The table 107 is supported by a retainer which is not shown in FIG. 1 so as to be movable (see the arrow "b") along the system axis 106.

Thus a CT system is configured so that the X-ray source 101 and the X-ray detector 104 are rotatable about the system axis 106 and movable along the system axis 106 relatively to the patient 103. Accordingly, X-rays can be cast on the patient 103 at various projection angles and in various positions with respect to the system axis 106. An output signal from the X-ray detector 104 when the X-rays are cast on the patient 103 are supplied to a volume data generating section 111 and converted into a volume data.

In sequence scanning, the patient 103 is scanned in accordance with each sectional layer of the patient 103. When the patient 103 is scanned, while the X-ray source 101 and the X-ray detector 104 rotate around the patient 103 about the system axis 106 as its center, the CT system including the X-ray source 101 and the X-ray detector 104 captures a large number of projections to scan each two-dimensional sectional layer of the patient 103. A tomogram displaying the scanned sectional layer is reconstructed from the measured values acquired at that time. While the sectional layers are scanned continuously, the patient 103 is moved along the system axis 106 every time the scanning of one sectional layer is completed. This process is repeated until all sectional layers of interest are captured.

On the other hand, during spiral scanning, the table 107 moves along the direction of the arrow "b" continuously while the CT system including the X-ray source 101 and the X-ray detector 104 rotates about the system axis 106. That is, the CT system including the X-ray source 101 and the X-ray detector 104 moves on a spiral track continuously and relatively to the patient 103 until the region of interest of the patient 103 is captured completely. In this embodiment, signals of a large number of successive sectional layers in a diagnosing area of the patient 103 are supplied to a volume data generating section 111 by the computed tomography apparatus shown in FIG. 1.

A volume data set generated by the volume data generating section 111 is introduced into a spherical MPR section 112 in an image processing section 116. The spherical MPR section 112, which is described later in detail, visualizes volume data. The spherical MPR section 112 determines coordinates by using each position on the reference plane and each distance from the reference plane, determines values on the coordinates in the volume data, and uses the determined values to render an image. The reference plane can be changed interactively as instructed from an operation section 113 (described later). The volume data rendered in the spherical MPR section 112 is supplied to a post-processing section 114.

The post-processing section 114 performs processing such as combined display of the image rendered in the spherical MPR section 112 and a histogram, parallel display of a plurality of images, animation image of displaying a plurality of images in sequence, simultaneous display with a virtual endoscope (VE) image. The image processed by the post-processing section 114 is supplied to a display 115 for displaying the image.

The operation section 113 receives operation signals from a keyboard, a mouse, etc. And generates a control signal of setting the reference plane in spherical MPR, coordinate determination of the volume data to be rendered, etc., and supplies the control signal to the image processing section 116. Accordingly, while viewing the image displayed on the display 115, the user can change the image interactively and can observe a diseased part in detail.

FIGS. 2A-2C are drawings to describe the image processing method using spherical MPR according to an embodiment of the invention. In the spherical MPR of the embodiment, first, coordinates are determined to define a spherical surface or a combination of a spherical surface and a flat plane, as shown in FIG. 2A and FIG. 2B. The coordinates are determined from each position on the reference plane and each distance from the reference plane so as to cut an intestine 12 by a cross section 11. The voxel values on the determined coordinates in the volume data are determined and they are projected onto a projection plane 13 in parallel, whereby a cross-sectional image 14 of the intestine 12 as shown in FIG. 2C is created. Unlike a CPR image, the image of the spherical portion is projected without being expanded, so that it becomes easy to understand 3 dimensional information. According to the technique, the processing amount can be decreased as compared with image of a virtual endoscope in the related art.

Figure 3B:
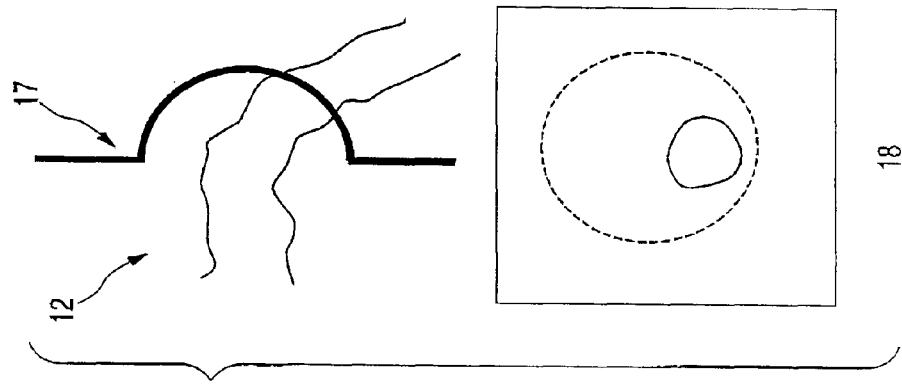
Figure 3A:
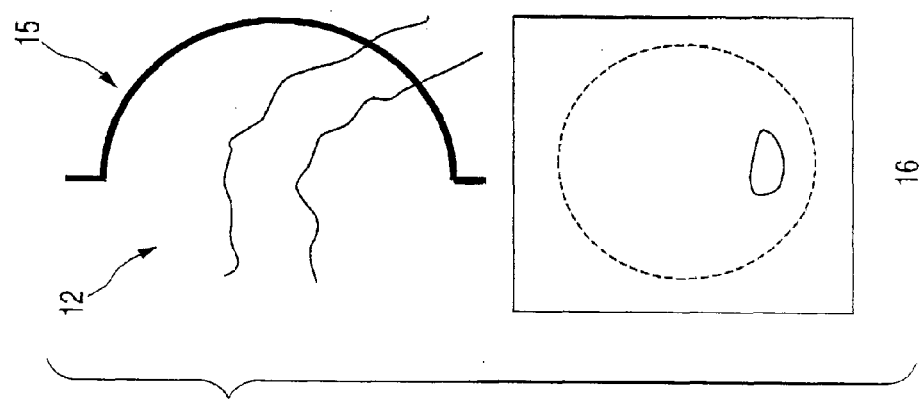

FIGS. 3A-3C are schematic representations for changing the radius of a spherical surface in the image processing method using spherical MPR according to the embodiment of the invention. In the embodiment, the user can change the radius of a spherical surface, a part of a cross section 15, 17, 19, interactively with a GUI (Graphical User Interface) as shown in a cross section 15 in FIG. 3A, a cross section 17 in FIG. 3B, a cross section 19 in FIG. 3C.

As shown in FIG. 3A, deeper part of the intestine 12 from the screen can be seen when the radius of the spherical surface is enlarged. And thus running of the intestine 12 in the depth direction of the inside of the intestine can be understood as shown in a cross-sectional image 16. On the other hand, if the radius of the spherical surface is made smaller, nearer part of the spherical surface is made smaller, nearer part of the intestine 12 from the screen is displayed as shown in a cross-sectional image 20 in FIG. 3C, enabling the user to 3-dimensionally observe the running of the intestine 12. Therefore, by setting the radius of the spherical surface appropriately according to the size of the intestine 12, a precise diagnosis can be conducted.

Figure 4A:
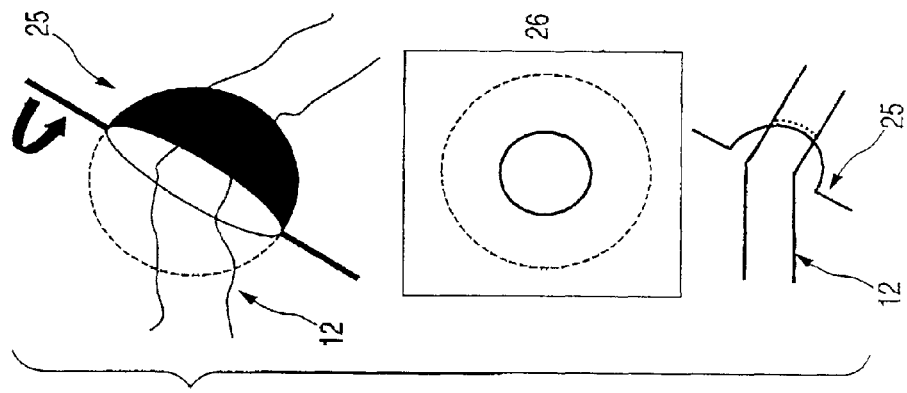
FIGS. 4A, 4B and 4C are schematic representations of changing the orientation of the cross section containing a spherical surface in the image processing method using spherical MPR according to an embodiment of the invention.
Figure 4B:
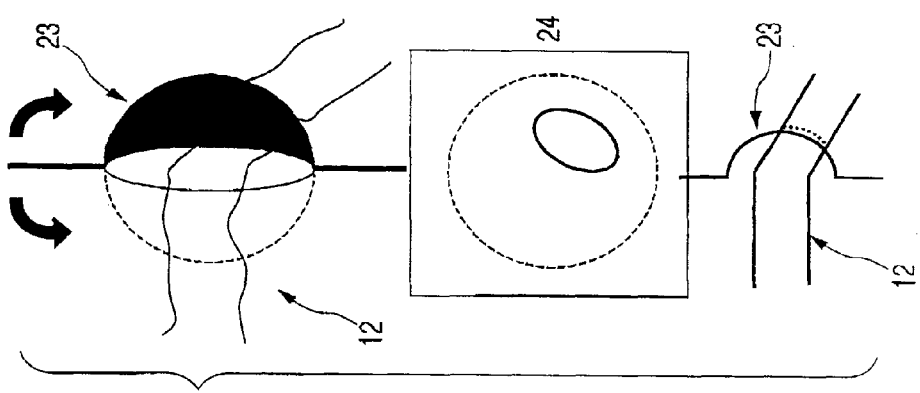
Figure 4C:
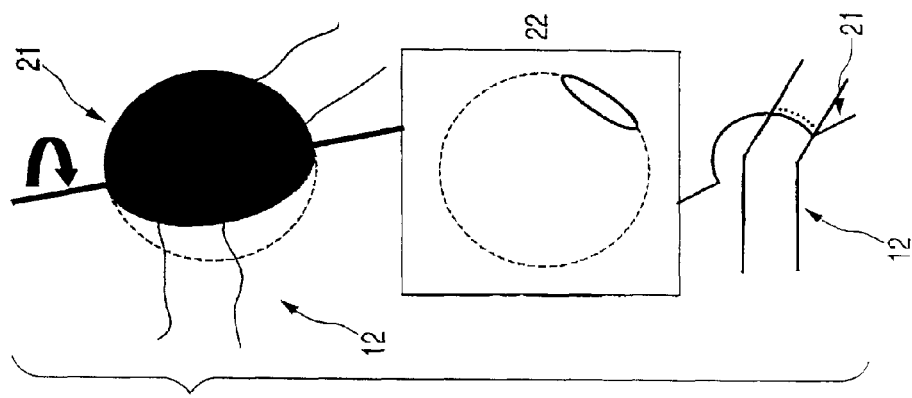

FIGS. 4A-4C are schematic representations for changing the orientation of the cross section containing a spherical surface in the image processing method using spherical MPR according to the embodiment of the invention. In the embodiment, a user such as a doctor can change the orientation of the cross section containing a spherical surface interactively with the GUI in virtual endoscope inspection of the intestine 12.

In this case, as shown in FIG. 4A and FIG. 4B, if the orientation of a cross section 21, 23 is inclined with respect to running of the intestine 12, the intestine 12 is displayed in response to the inclined angle in a cross-sectional image 22, 24. Further, unlike in a flat MPR image, if the orientation of the spherical surface is changed, the same part in the intestine 12 is successively rendered on the image and thus sight of the observation object is not lost. When the displayed intestine 12 is at the center of the image as shown in a cross-sectional image 26 in FIG. 4C, the screen is orthogonal to the running of the intestine 12, whereby the running direction and the orthogonal cross section of the intestine 12 can be easily determined.

Figure 5:
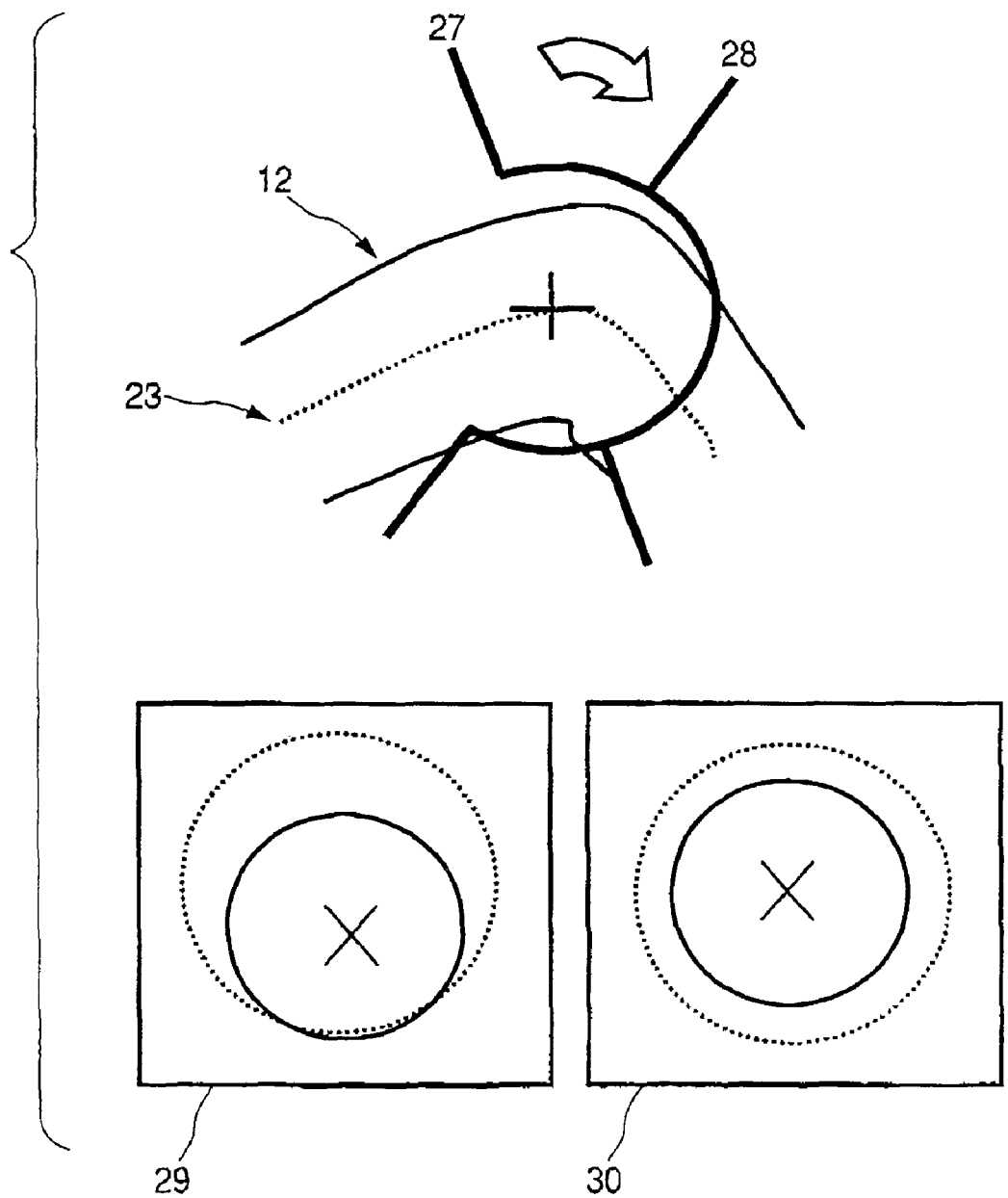
FIG. 5 is a drawing to describe advantage (1) of the image processing method using spherical MPR according to an embodiment of the invention.

FIG. 5 is a drawing to describe advantage (1) of the image processing method using spherical MPR according to the embodiment of the invention. According to the embodiment, the intersection portion of a cross section 27 and the tubular tissue (intestine 12) is displayed on a cross-sectional image 29 according to the cross section 27. Here, the intersection portion is displayed at a position shifted from the center of the cross-sectional image 29 and thus it is understood that the cross section 27 is not an orthogonal cross section with respect to the tubular tissue. Here, the cross section 27 is rotated to the cross section 28, whereby the intersection portion of the cross section 28 and the tubular tissue (intestine 12) is displayed as a cross-sectional image 30. In doing so, the intersection portion is displayed at the center of the cross-sectional image 30 and thus it is understood that the cross section 28 is an orthogonal cross section with respect to the tubular tissue. Thus, the hemispherical portion of the cross section 27, 28 can be used to determine the orientation of the tubular tissue (intestine 12) three-dimensionally, so that it becomes easy to search for the running direction and the orthogonal cross section of the tubular tissue.

Figure 6:
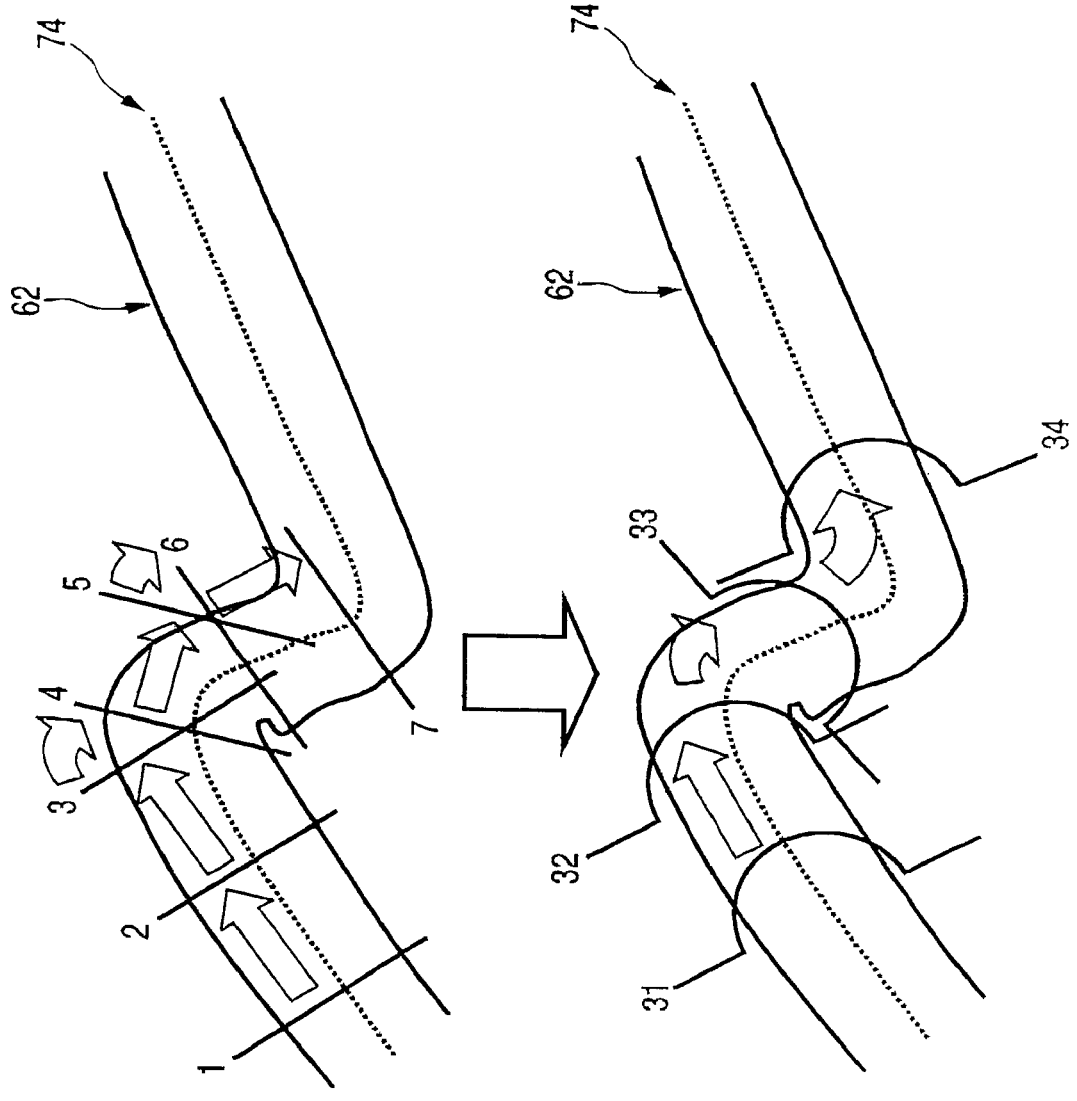
FIGS. 6A and 6B are drawings to describe advantage (2) of the image processing method using spherical MPR according to an embodiment of the invention.
Figure 7:
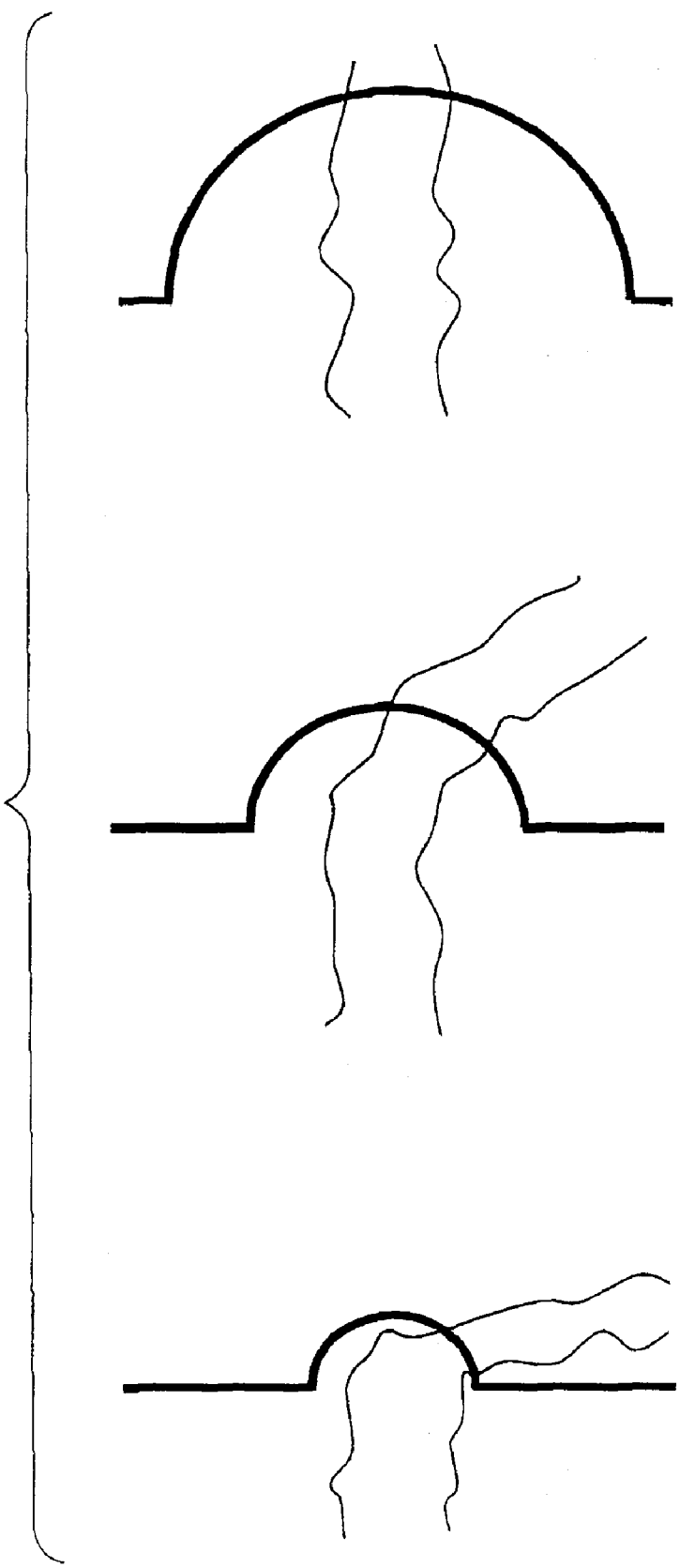
FIG. 7 is a drawing to describe adjustment of the size of a hemisphere (radius) in response to the thickness of tubular tissue in an embodiment of the invention.

FIGS. 6A and 6B are drawings to describe advantage (2) of the image processing method using spherical MPR according to the embodiment of the invention. In the related art, the center path 74 of the intestine 62 is set using the cross-sectional images of the planar cross-sections 1 to 7 as shown in FIG. 6A. In the embodiment, the center path 74 of the intestine 62 is set using the cross-sectional images cut by cross sections 31 to 34 each containing a spherical surface as shown in FIG. 6B. Hence, in the embodiment an orthogonal cross section can be easily obtained and in addition, information concerning the running direction can also be obtained, so that it becomes easy to set the center path 74. Further, as shown in FIG. 7, the size of a hemisphere (radius) is changed, whereby the distance at which the information concerning the running direction is obtained can be changed as desired, so that optimum information (information on the depth direction from the screen) can be acquired in response to the form and the thickness of tubular tissue. For example, in a part where the tubular tissue is largely bent, the radius of the hemisphere is lessened, whereby the bend of the tubular tissue can be understood precisely; in a part where the tubular tissue is straight, the radius of the hemisphere is increased, whereby information in a wide range can be acquired efficiently. Further, to set the center path, in a part where the tubular tissue is largely bent, the radius of the hemisphere is lessened, whereby the center path is set in small steps and is set reliably; in a part where the tubular tissue is straight, the radius of the hemisphere is increased, whereby the center path is set at large intervals and the center path can be set efficiently.

FIGS. 8A-8C shows several cross section projection methods of the embodiment. There are several modifications from example 1 of the image processing method of the embodiment. FIG. 8A shows parallel projection of a cross section 35 of an intestine 12 onto a projection plane 13, which is suited for observing the inner wall of the intestine 12 in detail. FIG. 8C shows perspective projection of the cross section 35 of the intestine 12 onto the projection plane 13 from an eye point 36, which is advantageous for displaying an image of the intestine 12 close to a virtual endoscope and comparing the image with a virtual endoscope image for observation. FIG. 8B shows combination of perspective projection of the inside of the intestine 12 and parallel projection of the intestine wall, which is suited for observing the intestine wall in detail while displaying an image of the intestine close to a virtual endoscope.

With any of the projection methods described above, distortion on scale or an image depending on the condition as with an image provided by flat MPR or a cylindrical projection method does not occur, and thus a more intuitive image can be provided, and the user can conduct a diagnosis without misunderstanding.

Spherical MPR with thickness for cutting an observed organ on a thick hemispherical cross section and displaying an image is also available as modified example 2 of the image processing method of the embodiment. That is, in addition to the voxel values of the points to render, the voxel values of the peripheral points are used to render an image. Whereby as with an MPR image with thickness and a CPR image with thickness in the related arts, the hemispherical cross section can be provided with a thickness, and the average value, the maximum value, or the minimum value of volume data can be displayed in the projection direction. In this case, the thickness may be variable depending on the observation place. According to the hemispherical MPR with thickness of the embodiment, noise of a contrast medium, etc., is reduced, meandering tissue such as a vessel is made easy to observe, and the center path of a vessel, etc., can be set easily, so that virtual endoscope inspection can be conducted rapidly.

FIGS. 9A-9F show various shapes of cross sections to cut volume data as modified example 3 of the image processing method of the embodiment. That is, spherical surface in FIG. 9A, ellipse in FIG. 9B, polygon in FIG. 9C, polyhedron in FIG. 9A, organ surface in FIG. 9E, rectangle in FIG. 9F, and the like are possible as cross sections. Thus, the shape of a cross section need not be a hemisphere or a surface of solid revolution. Specifically, the cross section may be any if it is a shape that can be represented as a distance from the reference plane such as a projection plane. For example, a cross section 41 is set along an organ surface of a heart 42, etc., as shown in FIG. 9E, whereby the state of the organ surface can be observed.

Figure 10A:
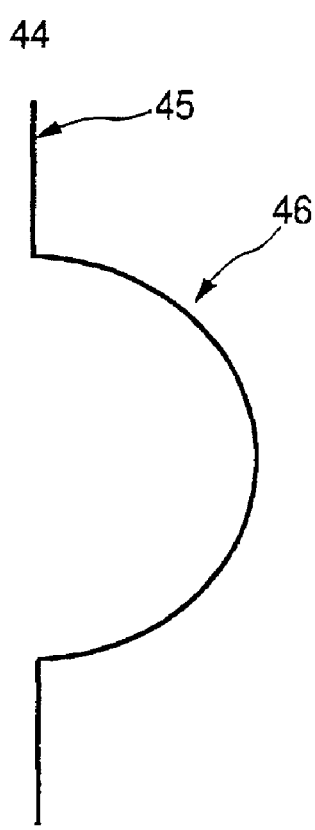
FIGS. 10A and 10B are schematic representations of the presence or absence of a flat plane in a cross section as modified example 4 of the image processing method of an embodiment of the invention.
Figure 10B:
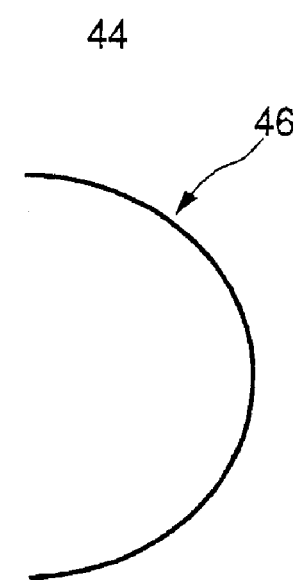

FIGS. 10A and 10B are schematic representations of the presence or absence of a flat plane in a cross section as modified example 4 of the image processing method of the embodiment. FIG. 10A shows the case where a cross section 44 is made up of a flat portion 45 and a spherical portion 46, which is suited for observing the depth of the center portion according to the spherical portion 46 and observing peripheral tissue at the same time according to the flat portion 45. On the other hand, FIG. 10B shows the case where the cross section 44 is the spherical portion 46 only, which is suited for concentrating on observation of the depth of the center portion for rapid inspection. By switching between the two display modes as required, the center portion is sufficiently observed and then the flat portion 45 is displayed, whereby the peripheral tissue can be checked.

FIGS. 11A-11D show displays of cross-sectional images as animation as modified example 5 of the image processing method of the embodiment. For example, when setting the center path of an intestine 12, animation display is generated in such a manner that when a move is made to a new point, automatically the radius of the spherical surface is gradually increased from 0 (cross-sectional image 48) to a predetermined setup value (cross-sectional image 51).

In doing so, the user can visually check which part on the flat cross section connects to which part on the spherical cross section, so that the user does not lose sight of the observation object, and particularly to check to see if the center path of tubular tissue is traced precisely, the animation display is advantageous to the user. Particularly, when the tubular tissue branches or when more than one tubular tissue runs side by side, tracking an erroneous tube can be prevented.

Figure 12:
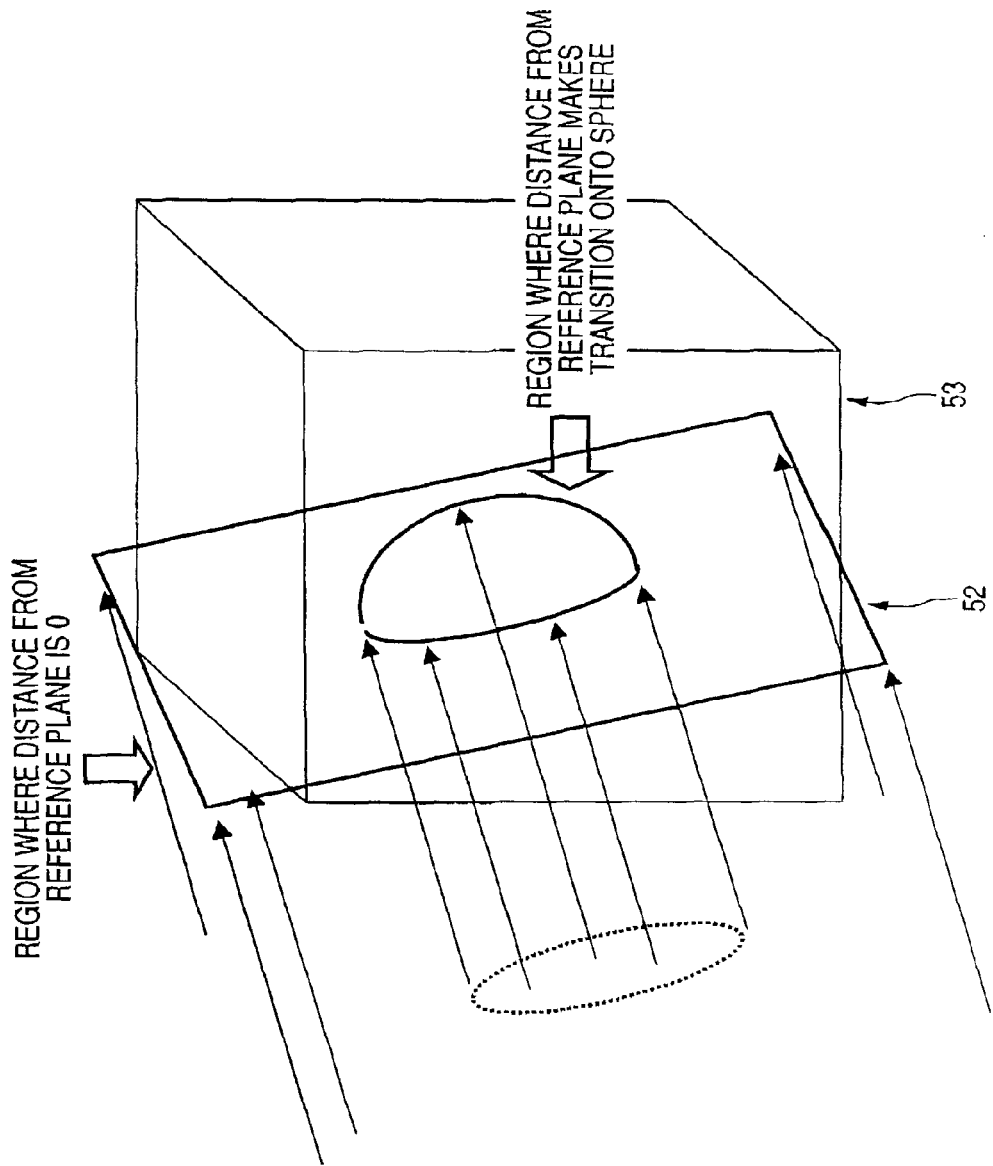
FIG. 12 is a drawing to describe an algorithm of the image processing method of an embodiment of the invention.

FIG. 12 is a drawing to describe an algorithm of the image processing method of the embodiment. In the spherical MPR of the embodiment, a volume 53 is cut by a surface at a distance of 0 from a reference plane 52 (flat portion) and a surface where the distance from the reference plane 52 makes a transition on a spherical surface (spherical portion), and is projected onto a predetermined projection plane.

Figure 13:
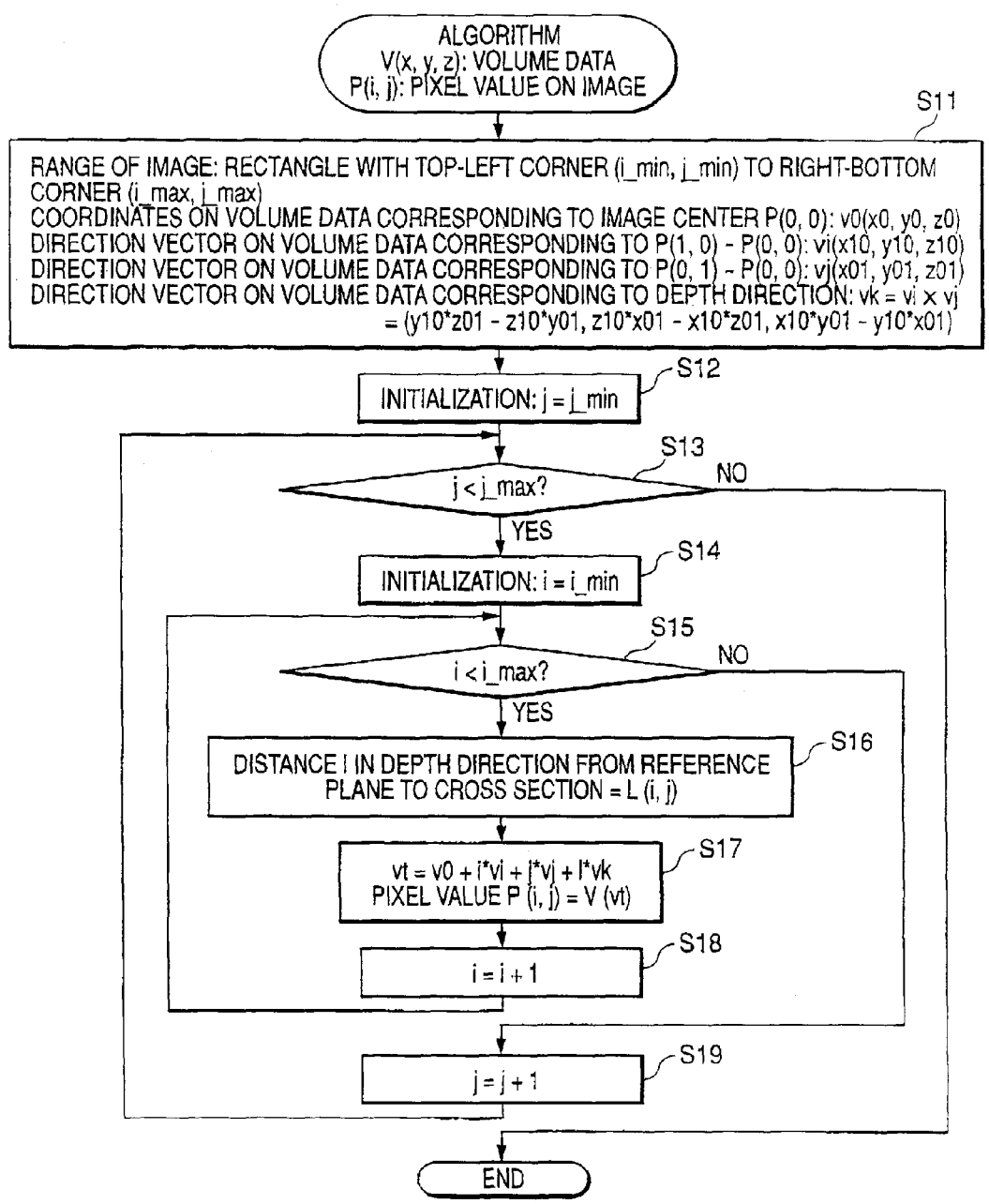
FIG. 13 is a flowchart to show a rendering algorithm in the image processing method of an embodiment of the invention.

FIG. 13 is a flowchart to show a basic rendering algorithm in the image processing method of the embodiment. In the image processing method of the embodiment, letting volume data be V (x, y, z) and the pixel value on an image be P (i, j), the range of the image is a rectangle with top-left corner (i_min, j_min) to right-bottom corner (i_max, j_max), and the coordinates on the volume data corresponding to the image center P (0, 0) are v0 (x0, y0, z0). The direction vector on the volume data corresponding per unit pixel P (1, 0)-P (0, 0) on the image is vi (x10, y10, z10), the direction vector on the volume data corresponding per unit pixel P (0, 1)-P (0, 0) on the image is vj (x01, y01, z01), and the direction vector on the volume data corresponding to the depth direction is vk=vi×vj=(y10*z01−z10*y01, z10*x01−x10*z01, x10*y01−y10*x01) (step S11).

Next, for initialization, j=j_min (step S12) and for loop, whether or not j<j_max is determined (step S13). If j<j_max, for initialization, i=i_min (step S14) and for loop, whether or not i<i_max is determined (step S15). If i<i_max, distance l in the depth direction to the reference plane=distance function L (i, j) is obtained (step S16). This is the distance in the depth direction between the cross section and the reference plane.

Next, the coordinates on the volume data corresponding to the distance l are calculated, vt=v0+i*vi+j*vj+l*vk. Then the voxel value of the coordinate is set to the corresponding pixel, pixel value P (i, j)=V (vt) (step S17), and i=i+1 (step S18) and j=j+1 (step S19) for performing the above-described processing for all pixel on the image.

Figure 14:
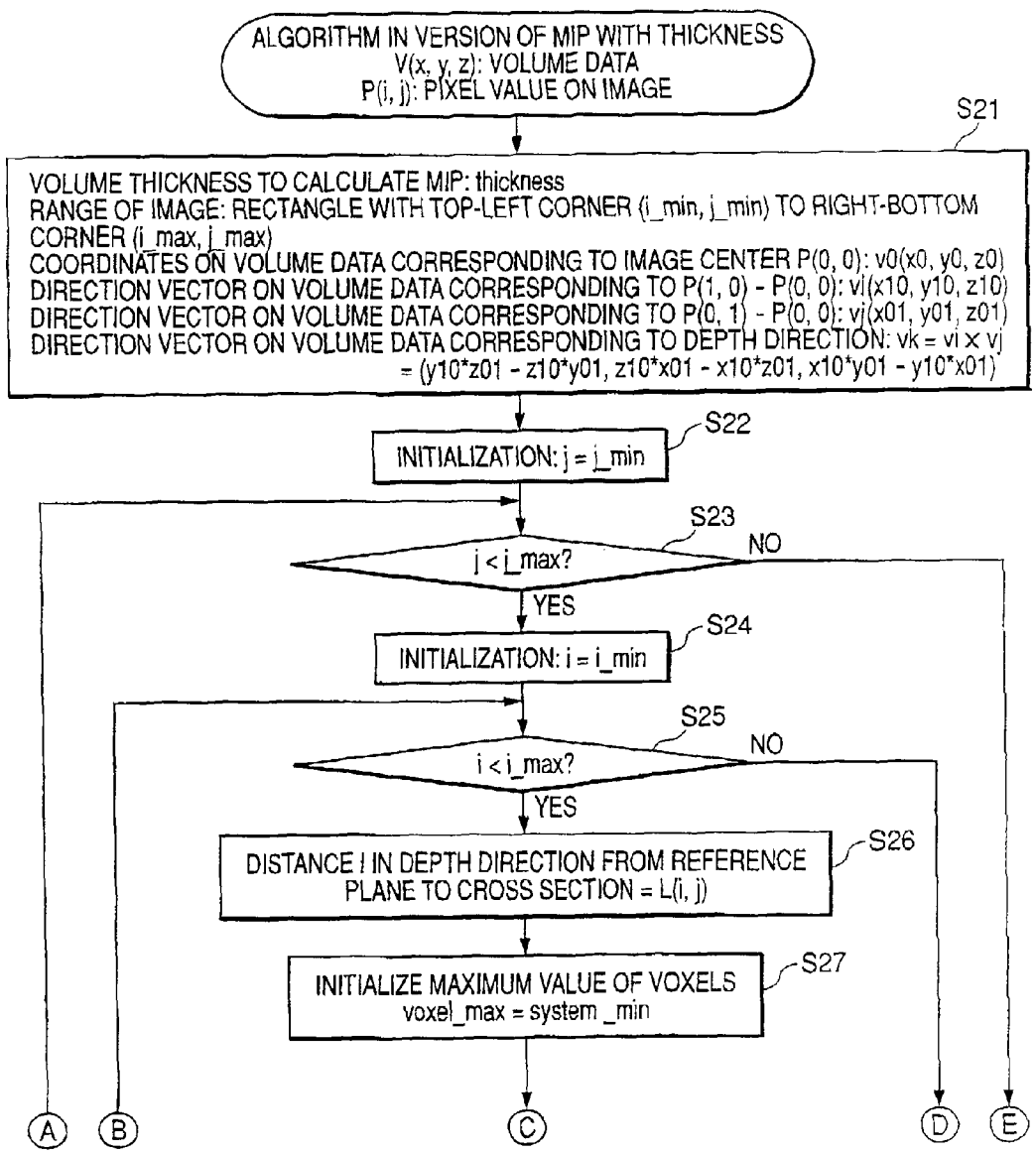
FIG. 14 is a flowchart (1) to show an algorithm in a version of MIP with thickness in the image processing method of an embodiment of the invention.
Figure 15:
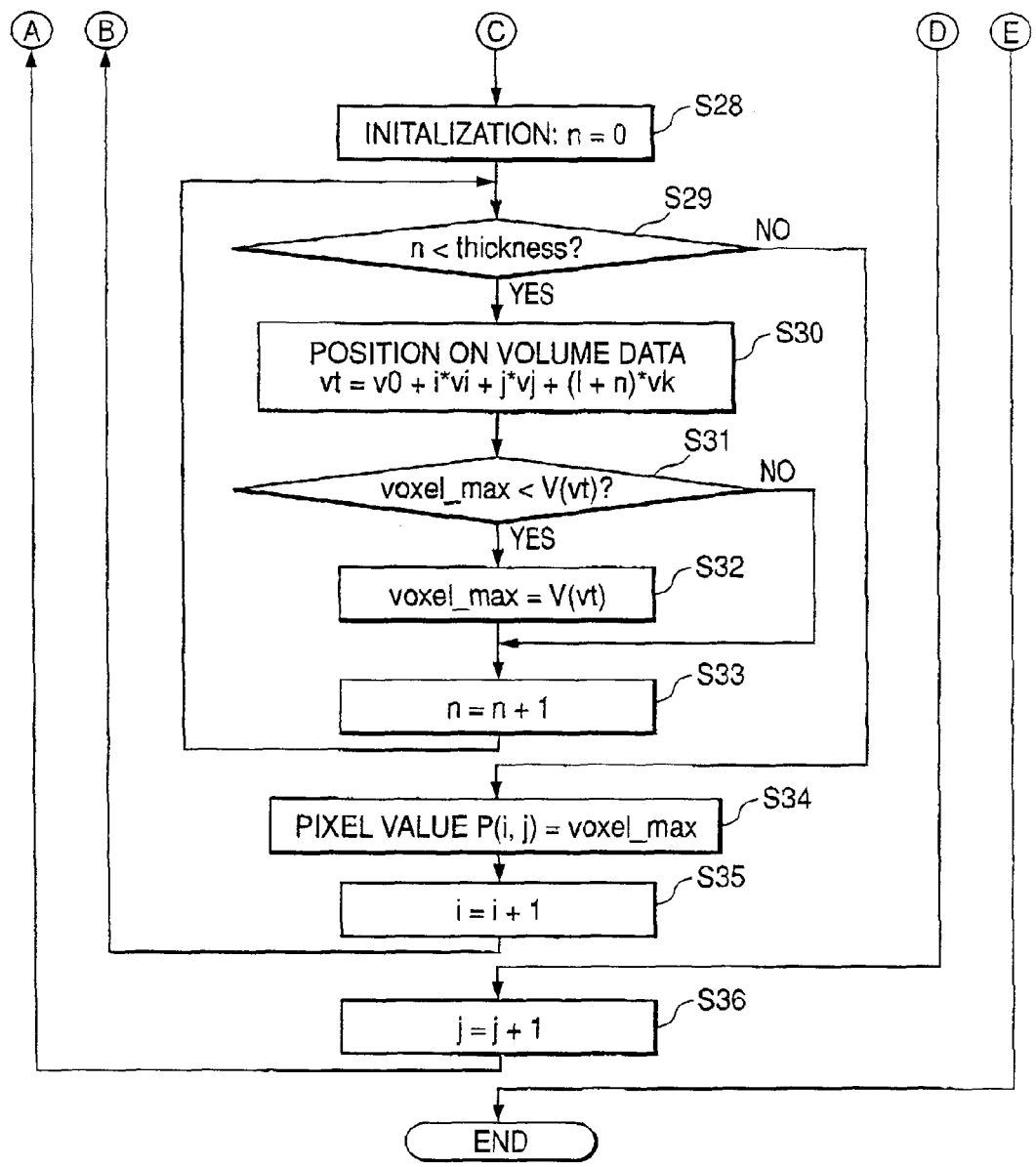
FIG. 15 is a flowchart (2) to show an algorithm in a version of MIP with thickness in the image processing method of the embodiment of the invention.

FIGS. 14 and 15 are flowcharts to show an algorithm in a version of MIP (Maximum Intensity Projection) with thickness in the image processing method of the embodiment. In the image processing method of the embodiment, letting volume data be V (x, y, z) and the pixel value on an image be P (i, j), the volume thickness to calculate MIP is thickness, the range of the image is a rectangle with top-left corner (i_min, j_min) to right-bottom corner (i_max, j_max). The coordinates on the volume data corresponding to the image center P (0, 0) are v0 (x0, y0, z0) and the direction vector on the volume data corresponding per unit pixel P (1, 0)-P (0, 0) on the image is vi (x10, y10, z10). Further, the direction vector on the volume data corresponding per unit pixel P (0, 1)-P (0, 0) on the image is vj (x01, y01, z01), and the direction vector on the volume data corresponding to the depth direction is vk=vi×vj=(y10*z01−z10*y01, z10*x01−x10*z01, x10*y01−y10*x01) (step 21).

Next, for initialization, j=j_min (step S22) and for loop, whether or not j<j_max is determined (step S23). If j<j_max, for initialization, i=i_min (step S24) and for loop, whether or not i<i_max is determined (step S25). If i<i_max, distance l in the depth direction to the reference plane=distance function L (i, j) is obtained (step S26). This is the distance in the depth direction between the cross section and the reference plane as same as in the usual algorithm.

Next, to initialize the maximum value of voxel expressing MIP value to the system minimum value, the maximum value of voxels is initialized to voxel_max=system_min (step S27) and for initialization, n=0 (step S28) and for loop, whether or not n<thickness is determined (step S29). If n<thickness, the position on the volume data, vt=v0+i*vi+j*vj+(l+n)*vk is found (step S30).

Next, whether or not voxel_max<V (vt) is determined (step S31). If voxel_max<V (vt), voxel_max=V (vt) is obtained (step S32) and n=n+1 (step S33) and then the process returns to step S29. If voxel_max<V (vt) is false in step S31, step S32 is skipped, then n=n+1 (step S33) and the process returns to step S29.

On the other hand, if n≧thickness at step S29, pixel value P (i, j)=voxel_max is obtained (step S34) and i=i+1 (step S35) and then the process returns to step S25. If i≧i_max at step S25, j=j+1 (step S36) and the process returns to step S23 for performing the above-described processing for all pixels on the image.

Figure 16:
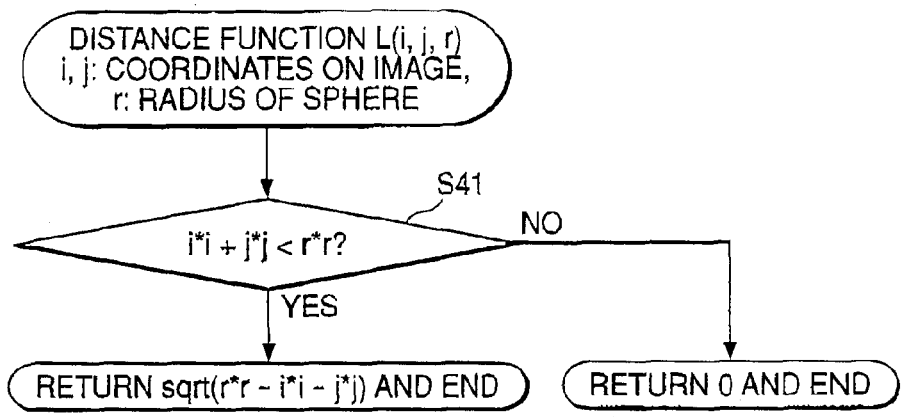
FIG. 16 is a flowchart to show details of a distance function L (for a hemisphere)

FIG. 16 is a flowchart to show details of the distance function L (for a hemisphere). To obtain the distance function L (i, j, r) by letting the coordinates on the image be i, j and radius of the sphere be r, whether or not i*i+j*j<r*r is determined (step S41). If i*i+j*j<r*r, sqrt (r*r−i*i−j*j) is returned and the process is terminated. On the other hand, if i*i+j*j≧r*r, 0 is returned and the process is terminated.

Figure 17:
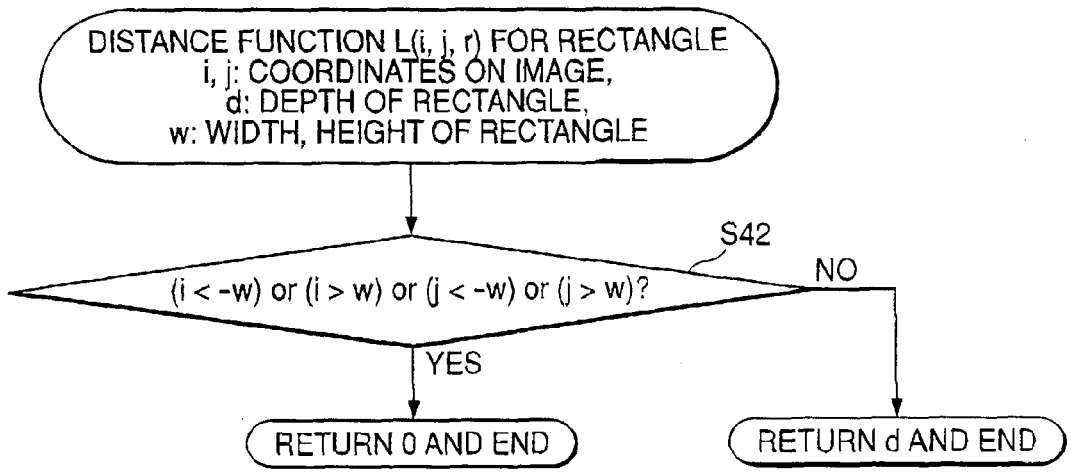
FIG. 17 is a flowchart to show details of a distance function L (for a rectangle)
Figure 19:
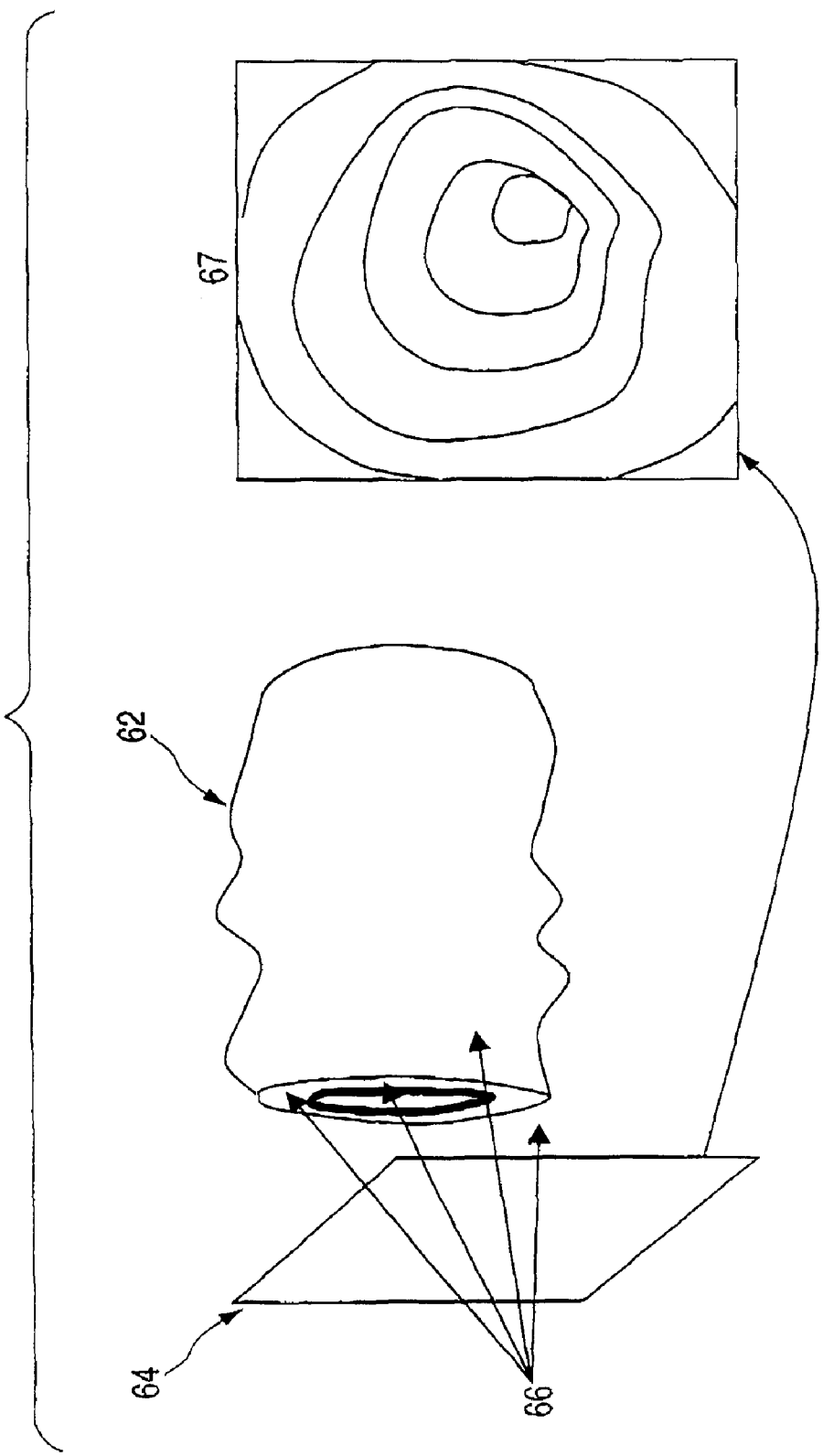
FIG. 19 is a drawing to describe virtual endoscope image in a related art.
Figure 21:
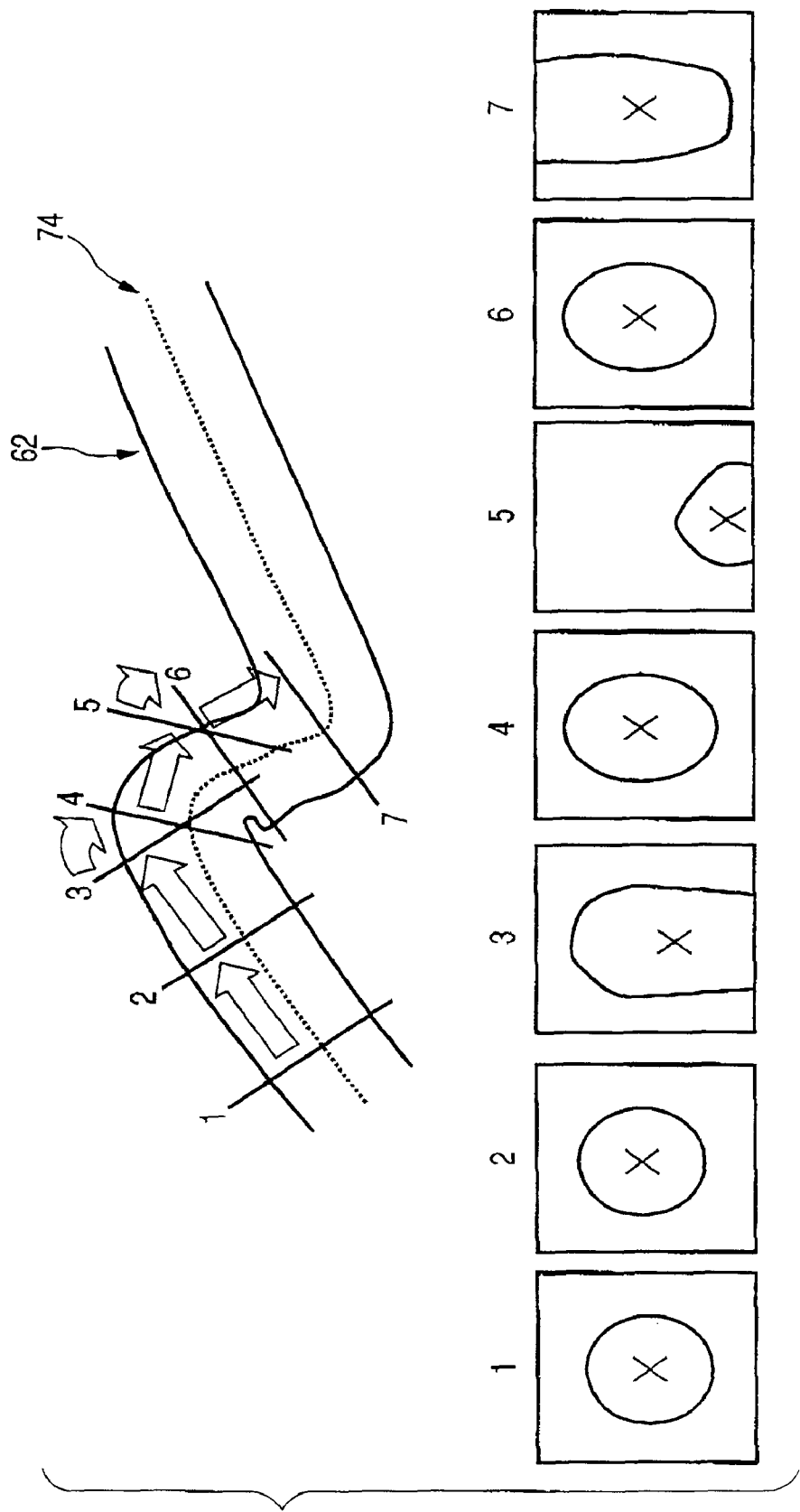
FIG. 21 is a drawing to describe problem (2) of the flat MPR in the related art.

FIG. 17 is a flowchart to show details of the distance function L (for a rectangle). To obtain the distance function L (i, j, d, w) for a rectangle by letting the coordinates on the image be i, j, the depth of the rectangle be d, and the width, height of the rectangle be w, whether (i<−w) or (i>w) or (j<−w) or (j>w) is determined (step S42). If (i<−w) or (i>w) or (j<−w) or (j>w), 0 is returned and the process is terminated; otherwise, d is returned and the process is termination.

As described above, in the image processing method of the embodiment, if the radius of the spherical surface is increased, the depth toward the screen can be seen and thus perspective of the inside of the observation object can be understood. On the other hand, if the radius of the spherical surface is lessened, the cut surface of the observation object is displayed as flat MPR and can be observed without distortion. Therefore, the radius of the spherical surface is set appropriately in conjunction with the thickness of the observation object, whereby a precise diagnosis can be conducted. The orientation of tubular tissue, etc., can be determined three-dimensionally using the hemispherical portion of the cross section without rotating the cross section on a flat plane, so that is becomes easy to search for an orthogonal cross section.

The invention can be used as the image processing method and the computer readable medium for image processing capable of displaying an orthogonal cross-sectional image of the tubular tissue of an intestine, a vessel, a trachea, etc., to be observed by simply operation.

According to the invention, the coordinates are defined as desired from each position on the reference plane and each distance from the reference plane, whereby a cross section provided by cutting the volume data as any desired shape without overhang can be drawn, so that display can be generated for enabling the user to easily understand the depth information of the observation object. Accordingly, the orthogonal cross section direction to the observation object the center path of the observation object can be set easily.

An embodiment of the invention can be also achieved by a computer readable medium in which a program code (an executable program, an intermediate code program, and a source program) according to the above described image processing method is stored so that a computer can read it, and by allowing the computer (or a CPU or an MCU) to read out the program (software) stored in the storage medium and to execute it.

The computer readable medium includes, for example, a tape-type medium, such as a magnetic tape or a cassette tape, a disc-type medium including a magnetic disc, such as a floppy (a registered trademark) disc or a hard disc, and an optical disc, such as CD-ROM/MO/MD/DVD/CD-R, a card-type medium, such as an IC card (including a memory card) or an optical card, and a semiconductor memory, such as a mask ROM, an EPROM, an EEPROM, or a flash ROM.

Further, the computer may be constituted such that it can be connected to a communication network, and the program may be supplied thereto through the communication network. The communication network includes, for example, the Internet, the Intranet, an intranet, and extranet, a LAN, an ISDN, a VAN, a CATV communication network, a virtual private network, telephone lines, a mobile communication network, and a satellite communication network. A transmission medium for constituting the communication network includes, for example, wire lines, such as IEEE1394, USB, power lines, cable TV lines, telephone lines, and ADSL lines, infrared rays, such as IrDA or a remote controller, and wireless lines, such as Bluetooth (a registered trademark), 802.11 Wireless, HDR, a mobile communication network, satellite lines, and a terrestrial digital broadcasting network. In addition, the program may be incorporated into carrier waves and then transmitted in the form of computer data signals.

It will be apparent to those skilled in the art that various modification and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing method for visualizing volume data of tissue, the image processing comprising:
   receiving the volume data, wherein the volume data is obtained based on a scan of the tissue using one of a tomographic scanner and a magnetic resonance imaging scanner;
   determining a reference lane intersecting a spherical surface;
   determining respective values in the volume data on outside of the intersection of the reference plane and one-side of the spherical surface;
   rendering an image by using the determined values; and
   rotating the reference plane at the center of the spherical surface.

2. The image processing method as claimed in claim 1, wherein the image is rendered by using only the values included in a partial region of the volume data.

3. The image processing method as claimed in claim 1, further comprising:
   modifying a single parameter with GUI (Graphical User Interface).

4. The image processing method as claimed in claim 1, further comprising:
   generating an animation image by modifying a single parameter.

5. The image processing method as claimed in claim 1, further comprising:
   modifying a radius of the spherical surface.

6. The image processing method as claimed in claim 1, wherein the image is rendered by using peripheral values in addition to the determined values.

7. The image processing method as claimed in claim 1, wherein the volume data is volume data of a tubular tissue, and
   the image processing method further comprising:
   determining an orthogonal cross section of the tubular tissue with GUI (Graphical User Interface); and
   rendering each voxel on the orthogonal cross section.

8. The image processing method as claimed in claim 1, wherein the volume data is volume data of a tubular tissue, and the image processing method further comprising:
   determining a center path of the tubular tissue with GUI (Graphical User Interface).

9. A computer readable medium having a program including instructions for permitting a computer to perform image processing for visualizing volume data, the instructions comprising:
   determining a reference plane intersecting a spherical surface;
   determining respective values in the volume data on outside of the intersection of the reference plane and one-side of the spherical surface;
   rendering an image by using the determined values; and
   rotating the reference plane at the center of the spherical surface.

* * * * *

UNITED STATES PATENT AND TRADEMARK OFFICE
CERTIFICATE OF CORRECTION

| | | |
|---|---|---|
| PATENT NO. | : 7,869,638 B2 | Page 1 of 1 |
| APPLICATION NO. | : 11/559415 | |
| DATED | : January 11, 2011 | |
| INVENTOR(S) | : Kazuhiko Matsumoto | |

It is certified that error appears in the above-identified patent and that said Letters Patent is hereby corrected as shown below:

In Column 1, Line 33, please delete the "&".

In Column 1, Line 42, please delete "b", and insert therefor --by--.

In Column 1, Line 47, please delete "_"

In Column 2, Line 20, please delete "art n", and insert therefor --art. In--.

In Column 2, Line 66, please delete "MPB", and insert therefor --MPR--.

In Column 3, Line 2, after the word "intestine", please insert therefor --62.--.

In Column 8, Line 62, please delete "9A", and insert therefor --9D--.

In Column 12, Claim 1, Line 11, please delete "lane", and insert therefor --plane--.

Signed and Sealed this
Twenty-fourth Day of May, 2011

David J. Kappos
*Director of the United States Patent and Trademark Office*